United States Patent Office 3,037,952
Patented June 5, 1962

3,037,952
AQUEOUS COMPOSITIONS COMPRISING WATER INSOLUBLE LINEAR POLYMER AND AN AMMONIUM SALT OF A COPOLYMER OF METHYL METHACRYLATE AND ACRYLIC ACID MONOMER AND ARTICLE COATED THEREWITH
Arthur D. Jordan, Jr., Moorestown, N.J., and Walter W. Toy, Philadelphia, Pa., assignors to Rohm & Haas Company, Philadelphia, Pa., a corporation of Delaware
No Drawing. Filed Dec. 12, 1957, Ser. No. 702,267
17 Claims. (Cl. 260—29.6)

This invention relates to aqueous coating compositions adapted to produce in improved manner clear glossy coatings substantially free of blocking tendencies even under severe temperature and humidity conditions. It is particularly concerned with the preparation of such coating compositions as are especially useful for the production of clear glossy non-blocking coatings on fibrous bases or substrates such as paper, paperboard, or the like.

Heretofore aqueous solutions of thermosetting aminoplast condensates have been applied for the production of clear glossy coatings, such as on paper, but such compositions require the use of substantial amounts of catalyst, generally of acidic character, and require the use of extremely high curing temperatures in order to convert the condensate to insoluble condition in which it is free of blocking. Coatings have been applied to paper by means of water-insoluble linear addition polymers which require no use of an acidic catalyst for converting them to insoluble form. If such polymers are of hard character, that is sufficiently hard to avoid severe blocking, they must be applied from organic solvent solutions or application of aqueous dispersions thereof must be accompanied by the use of extremely high temperatures in order to effect coalescence into a continuous film. On the other hand, when relatively soft addition polymers of water insoluble character are applied from aqueous dispersions so that normal or only moderately elevated temperatures are required to effect coalescence of the polymer, a coating is deposited which has pronounced tendency to block even under the mildest conditions of temperature and humidity. There is also a tendency for such aqueous dispersions of soft addition polymers to form pinholes in the coatings on drying when thin coatings are desired unless the surfaces to which the coatings are applied are quite smooth or special care is taken in the coating operation. It has been suggested heretofore to overcome the disadvantage of the soft polymers by including substantial proportions of fillers or pigments within the aqueous dispersion. This expedient reduces the tendency of the coating to block but cannot be resorted to when it is desired to produce clear glossy coatings. In accordance with the invention disclosed in U.S. Patent 2,757,106, a practical way of overcoming this tendency of the softer polymers to block is accomplished by introducing into the polymer molecule a small proportion of carboxylic groups and by also introducing into the aqueous dispersion before deposition of the coating a polyvalent metal compound, such as basic aluminum acetate, calcium hydroxide, or the like, so that, on drying, the polyvalent metal salt cross-links the polymer molecules and thereby renders the coating resistant to blocking. This procedure requires the modification of the copolymer by the introduction of carboxylic acid groups.

In accordance with the present invention, it has been found that non-blocking coatings can be obtained from aqueous dispersions of water-insoluble addition polymers having sufficient softness to adapt them to coalesce on deposition at normal room temperatures or at moderately elevated temperatures without the need to introduce carboxyl groups or any other hydrophilic groups into the copolymer. The coating compositions of the present invention do not require high temperatures during the deposition or drying stages, and there is no need of a curing catalyst or a baking operation.

In order to accomplish these objectives, there is provided in accordance with the present invention an aqueous coating composition in the form of an aqueous dispersion of (a) a water-insoluble linear addition polymer having a $T_i$ as defined hereinbelow of not above 30° C., such as from about −45° C. to +30° C. and (b) certain salts of a linear copolymer of 20 to 30% by weight of acrylic or methacrylic acid with 80 to 70% by weight respectively of methyl methacrylate having low average molecular weights. It is difficult to determine the molecular weight of polymers containing substantial amounts of carboxyl groups therein, but, on the basis of the amount of chain-transfer agent used and on the assumption that such agent provides a molecular weight reduction comparable to what it produces in acrylate and methacrylate ester polymer systems which do not involve carboxyl groups, it is estimated that the average molecular weights of the acrylic or methacrylic acid copolymers herein used are in the range from about 10,000 to 35,000. Preferably the average molecular weight is about 20,000 to 30,000. The acrylic or methacrylic acid copolymers may be identified in terms of their viscosities in the form of their simple neutral ammonium salts at a concentration of 22% polymer solids in water at normal room temperature (20° C.). These viscosities should be from 2 to 30 poises.

It is essential that the copolymers do not contain an amount of acrylic or methacrylic acid salt units in excess of 30% by weight since the coatings obtained from the mixed polymer compositions containing the copolymer having over 30% acrylic or methacrylic acid salt units become noticeably and objectionally water-sensitive. On the other hand, the use of copolymers containing appreciably less than 20% acrylic or methacrylic acid salt units surprisingly has the disadvantage of excessive viscosity and accompanying difficulties of application.

These acrylic or methacrylic acid copolymer salts may be obtained by neutralization with ammonium hydroxide to a pH of about 6.5 to 10 of an aqueous emulsion copolymer dispersion obtained by the emulsion copolymerization in the presence of about 3 to 5%, based on the weight of monomers, of a chain-transfer agent of a mixture of 20 to 30% by weight of acrylic acid or methacrylic acid and 70 to 80% of methyl methacrylate.

Except for the inclusion of about 3 to 5% by weight, based on the weight of monomers, of a chain-transfer agent, the copolymer dispersion may be made by any of the conventional emulsion polymerization procedures. For example, the polymerization procedures disclosed in the passage of McLaughlin et al., United States Patent 2,790,736, Column 4, lines 8 to 74, may be employed provided the proportion of a chain-transfer agent or chain regulator just specified above be included within the polymerization mixture in addition to the other ingredients. The passage of that patent just referred to is incorporated herein by reference. The chain-transfer agents which serve to reduce the molecular weight of the polymer obtained by the emulsion polymerization procedure in proportion to the amount of chain-transfer agents used may be any one of the following: long-chain alkyl mercaptans, e.g., t-dodecyl mercaptan, isopropanol, isobutanol, long-chain alcohols, e.g., lauryl alcohol, t-octyl alcohol, $CCl_4$, $C_2Cl_4$, and $CBrCl_3$.

The $T_i$ value referred to is the transition temperature or inflection temperature which is found by plotting the modulus of rigidity against temperature. A convenient method for determining modulus of rigidity and transition temperature is described by I. Williamson, British Plastics 23, 87–90, 102 (September 1950. The $T_i$ value here used is that determined at 300 kg./cm.$^2$.

The salt of the latter copolymer (component (b)) may be either a simple ammonium salt or a complex zinc ammonium salt.

The complex zinc ammonium salt may be prepared by adding ammonium hydroxide to a solution of zinc acetate or other water-soluble zinc salt, thereby initially precipitating zinc hydroxide, which is redissolved by the addition of more ammonium hydroxide, thereby producing a solution of the zinc ammonium acetate or other complex zinc ammonium salt which is then added to the aqueous dispersion of the ammonium salt of the methyl methacrylate/methacrylic acid or methyl methacrylate/ acrylic acid copolymer. The complex zinc ammonium salt of the copolymer has the advantage that it produces a final coating having even greater resistance to water than coatings formed from the simple ammonium salt thereof. The latter coatings, however, have good water-resistance which is adequate for most purposes. Generally, the simple ammonium copolymer salts are preferred because of their inexpensiveness. Finely divided zinc oxide of 1 to 100 micron size, preferably of pigment grade, such as not over 45 to 50 micron size, may be suspended in the aqueous dispersions of the two polymers (components (a) and (b)), especially when the simple ammonium salt of component (b) is used. It serves to cross-link the carboxyl-containing polymers on drying, during which the ammonia is apparently replaced by the zinc ion. The amount of zinc oxide may be from about 5 to 20%, and is preferably about 10% on the weight of the total polymer solids (a) and (b).

The proportions of the copolymer salt (component (b)) and the other polymer (component (a)) may generally be from 10 to 35 parts of the former to 90 to 65 parts of the latter, depending upon the particular components mixed. Preferably, from 70 to 85 parts of (a) are mixed with 30 to 15 parts respectively of (b).

The first-mentioned polymer (component (a)) may contain a small proportion of hydrophilic groups up to about 2.5% by weight thereof in the polymer molecule, but it is preferred that the copolymer consist entirely of hydrophobic polymer units. The aqueous dispersion of this water-insoluble linear addition polymer may be formed by conventional emulsion polymerization or copolymerization procedures, such as those disclosed in U.S. Patent 2,790,736 supra, from a single monomer or from a mixture of monomers which form homopolymers or copolymers having a $T_i$ which is not above 30° C. Monomers which form sufficiently soft homopolymers include the acrylates of primary and secondary alcohols, such as those having from 1 to 18 carbon atoms. Other monomers which form sufficiently soft homopolymers include the methacrylates of alcohols having 5 to 18 carbon atoms. Homopolymers of any of these monomers or copolymers of a mixture of two or more of these monomers may be employed for the purpose of producing water-insoluble linear addition polymers for the aqueous coating compositions of the present invention. Preferably, however, the methyl, ethyl, propyl, or butyl acrylates are employed. Any of these monomers which form soft polymers may be copolymerized with such hardening comonomers as the lower alkyl methacrylates in which the alkyl group may have from 1 to 4 carbons, namely the methyl, ethyl, propyl, and butyl methacrylates, styrene, acrylonitrile, methacrylonitrile, vinyl acetate, vinyl chloride, vinylidene chloride, and the like. The amount of hard comonomer that may be copolymerized with one of the soft monomers above depends upon the particular hard and soft comonomers to be copolymerized. The following list gives, for several typical copolymer systems, approximately the maximum amount of a particular hard comonomer that may be used with a particular soft comonomer to provide copolymers which have $T_i$ values of about 10° C. and lower. They are accordingly within the preferred range cited above and considerably more of the hard comonomer could be used to provide copolymers which are still within the maximum scope of the invention as defined by the upper $T_i$ limit of 30° C. For example, a copolymer of 64% by weight of ethyl acrylate and 36% of methyl methacrylate has a $T_i$ value of about 20° C.:

Methyl acrylate 75, ethyl acrylate 25,
Ethyl acrylate 76, methyl methacrylate 24,
Ethyl acrylate 78, styrene 22,
Ethyl acrylate 78, acrylonitrile 22,
Ethyl acrylate 20, butyl methacrylate 80,
n-Propyl acrylate 62, methyl methacrylate 38,
n-Propyl acrylate 72, acrylonitrile 28,
Butyl acrylate 58, methyl methacrylate 42,
Butyl acrylate 68, acrylonitrile 32,
Butyl acrylate 10, butyl methacrylate 90,
Butyl acrylate 57, styrene 43.

Copolymers of 35 to 65% by weight of butadiene with 65 to 35% respectively by weight of acrylonitrile or styrene are also useful copolymers having $T_i$ values below 30° C.

The emulsifiers or dispersing agents that may be used for preparing the monomeric emulsions before polymerization or dispersions of the polymer after polymerization may be anionic or non-ionic or a mixture of non-ionic type with an agent of anionic type. The amount of emulsifier or dispersing agent may depend upon the particular monomeric system, but in general is from ½% to 3% by weight of the monomers employed.

Suitable anionic dispersing agents include the higher fatty alcohol sulfates, such as sodium lauryl sulfate, alkylaryl sulfonates, e.g., sodium or potassium isopropylbenzene sulfonates or isopropyl naphthalene sulfonates, alkali metal higher alkyl sulfosuccinates, e.g., sodium octyl sulfosuccinate, sodium N-methyl-N-palmitoyltaurate, sodium oleyl isothionate, alkali metal salts of alkylarylpolyethoxyethanol sulfonates or sulfates, e.g. sodium t-octylphenoxypolyethoxyethyl sulfate having 1 to 5 oxyethylene units.

Suitable non-ionic dispersing agents include the following: alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene-linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as are found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units; etc.; also ethylene oxide condensates of long chain or branched-chain amines, such as dodecylamine, hexadecylamine, and octadecylamine, containing 6 to 60 oxyethylene groups, block copolymers of ethylene oxide and propylene oxide comprising a hydrophobic propylene oxide section combined with one or more hydrophilic ethylene oxide sections.

Instead of using one of the anionic or non-ionic emulsifiers mentioned, the copolymer salt (component (b)) may be employed as the emulsifier for the monomers in the emulsion copolymerization to form the aqueous dispersion of the water-insoluble copolymer (component (a)), or it may be used as a dispersing agent for dispersing a finely divided polymer or copolymer (component (a)) to form the aqueous dispersion thereof.

If the copolymer salt (component (b)) is used as the empusifying or dispersing agent in the preparation of the aqueous dispersion of component (a), the amount used may be just sufficient to effect the emulsifying or dispersing actions required, in which event additional copolymer salt (component (b)) is added later to provide the proper relative proportions between components (a) and (b) as defined hereinabove. On the other hand, the full amount of the copolymer salt needed to form the proper proportion thereof in the final aqueous dispersion may be initially introduced to serve as the emulsifying or dispersing agent.

When the aqueous dispersion of the water-insoluble linear addition polymer (component (a)) is formed by means of one of the other emulsifying agents, it is merely necessary to add to the aqueous dispersion of component (a) thereby obtained, the proper proportion of the methacrylic or acrylic acid copolymer salt. The product is an essentially stable dispersion which is relatively non-corrosive since it contains no strongly acid material, such as an acidic catalyst, commonly used in thermosetting aminoplast compositions. The concentration may be from 5 to 70% total solids.

The composition may be applied to the substrate to be coated in any suitable manner, such as by a knife coater or by dipping, roller-coating, spraying, brushing, or the like. After application, it is merely necessary to pass the coated substrate, such as the paper, through the normal drying equipment. The dispersed polymeric materials coalesce during the drying to form a clear continuous film, which is highly glossy and resistant to water, to grease, and to blocking. The coating on the substrate obtained from the composition is essentially a mixture of the several components described hereinabove except that the copolymer salt is substantially converted into free acid and/or amide and/or imide form as the result of the volatilization of ammonia. In the case of the complex zinc ammonium salt, the final copolymer remains as an insoluble zinc salt thereof. The use of zinc oxide produces an insoluble cross-linked zinc salt of the methacrylic or acrylic acid copolymer. If desired, a top-coating may be applied from an aqueous dispersion containing alum and the salt of one of the methacrylic acid or acrylic acid copolymers mentioned hereinabove.

The use of zinc oxide has the remarkable characteristic of increasing the temperature at which blocking occurs to a point above the charring temperature of paper which occurs at about 180° C. In this system, also, the coating becomes completely integral in the sense that the usual solvents that remove the emulsifiers used in making the emulsion copolymers (component (a)) from coatings obtained therefrom in normal fashion and even from the other systems of the present invention show little or no removal of such emulsifiers from the "integral" coatings made with the systems of the present invention using zinc oxide in the proportions above. The coatings obtained with zinc oxide are especially valuable because of their high block-resistance and resistance to solvents and plasticizers. They are, accordingly, useful as film- and sheet-casting bases. Thus paper or other substrate carrying such a coating can be formed in a continuous band and a film-forming solution or dispersion in organic solvents or plasticizers of a vinyl or acrylate polymer may be applied to the coated face of the base, dried, and fused at elevated temperatures, such as up to 180° C. or more. The cooled casting can then be stripped and a glossy face is obtained on the side of the cast film or sheet which had previously been in contact with the casting support. Previously used organosol-release coatings for paper and like bases have generally produced dull surfaces on the face of the cast film which had been in contact with the release coating or they have had the disadvantage of being water-sensitive or water-soluble. The coatings of the present invention are insensitive to moisture and are grease-resistant.

The fibrous substrates to which the compositions are applied in carrying out the present invention include papers of all types, such as bond writing paper, fibrous paperboards such as cardboard, chipboard, carton stock, and the like, wrapping papers or boards, or liners for containers intended for the packaging of foods, greases, chewing gum, soap, soap powders, cosmetics, calking compounds, etc. The coated papers may also be used as wall papers, papers for lining drawers and shelves, especially in linen closets, kitchen cabinets and so forth, and the coated paper or paperboards may be used as bookcovers or book pages. An amazing discovery is that the aqueous coating composition can be applied directly over hydrophobic inks, such as may be on decorated or printed papers or cardboards, particularly such as are used for postcards, book or magazine covers, advertising posters, wall papers, shelf papers and the like, without being repelled thereby and without smudging or showing any evidence of attack upon the printing or decorative matter. The composition may be applied to photographs or photostats to provide a clear glossy protective coating which is still highly receptive to printing and substantially stable to ultraviolet light. The coatings may be applied to building construction papers and boards, such as the facing paper on plasterboard. The composition may be used as a release coating on a paper to be used as a liner in a concrete molding form or adapted to be used for covering freshly-laid concrete roads.

For many of these purposes, the non-blocking and mar-resistant characteristics of the coated products are quite important. An important advantage is also the fact that no high temperatures are required, nor is any acid catalyst required to convert the coated films into water-insoluble or non-blocking coatings. The use of the aqueous dispersions also avoids the danger of fire and the toxic effects on operators. It requires no equipment for solvent recovery.

In the following examples, which are illustrative of the present invention, the parts and percentages are given by weight unless otherwise indicated. The heat-seal temperature referred to is the temperature at which two coated sheets first begin to show traces of sticking together sufficiently to mar the coating upon separation of the sheets.

*Example 1*

(a) An aqueous dispersion of a polymer is prepared by the emulsion copolymerization at a temperature of about 85° C. of a mixture of 72.5 parts of methyl methacrylate, 27.5 parts by weight of methacrylic acid, and 3.0 parts of bromotrichloromethane in about 250 parts of water in the presence of 1.5 parts of sodium lauryl sulfate and 0.25 part of ammonium persulfate. After polymerization, the dispersion (342 parts) is diluted with water (28.8 parts) and neutralized to a pH of 7.5 with 28% aqueous ammonium hydroxide (29.2 parts), and the final dispersion containing about 22% polymer salt solids has a viscosity of 4.8 poises.

(b) An aqueous coating composition is prepared by mixing 218 parts of an aqueous dispersion containing about 46% of an emulsion copolymer of about 66% by weight of ethyl acrylate (EA) with 34% by weight of methyl methacrylate (MMA) and 182 parts of the 22% dispersion obtained in part (a). The resulting dispersion contains 100 parts of a copolymer of ethyl acrylate: methyl methacrylate (66:34 weight ratio) and 40 parts of the ammonium salt obtained in part (a). A chipboard coated with the composition and dried showed no blocking at 140° F. and 75% relative humidity when a plurality of the coated boards were stacked upon one another under a weight of 2¾ lbs./sq. in. The coated board showed a heat-seal temperature of 210° F. Coatings obtained in the same way from the ethyl acrylate/methyl methacrylate copolymer but without the ammonium copolymer salt exhibited severe blocking under the above conditions and showed a heat-seal temperature of about 140° F.

Example 2

(a) An aqueous dispersion having a pH of about 7.0, a viscosity of 16 poises, and containing 22% of the ammonium salt of a copolymer of 25% of methacrylic acid (MAA) and 75% of methyl methacrylate is prepared by the method of Example 1(a).

(b) A coating composition consisting of an aqueous dispersion of 100 parts of a copolymer of 75% of vinyl acetate with 15% of methyl acrylate and 10% of ethyl acrylate and 40 parts of the ammonium salt of part (a) hereof is obtained by mixing 218 parts of a 46% dispersion of the vinyl acetate copolymer with 182 parts of the 22% dispersion obtained in part (a) hereof. A clear glossy coating is obtained showing no evidence of blocking at 140° F. and 75% relative humidity under a pressure of 2¾ lbs./sq. in. The coating showed a heat-seal temperature of 180° F. Coated chipboard obtained from aqueous dispersions of the vinyl acetate copolymer without the ammonium salt exhibited severe blocking under the conditions mentioned and had a heat-seal temperature below 180° F.

Example 3

(a) By the general procedure of Example 1 paperboard is coated with an aqueous dispersion containing 100 parts of a copolymer of ethyl acrylate:methyl methacrylate:itaconic acid in 87.5:10.0:2.5 weight ratio, and 40 parts of the ammonium salt of a methyl methacrylate:methacrylic acid, 75:25 weight ratio, copolymer. The viscosity of a 22% solids solution of the ammonium salt is about 28 poises. The coating has a heat-seal temperature of 210° F. No blocking occurs when the coated board is stacked face-to-face and face-to-back overnight at 140° F. and 75% relative humidity under a pressure of 2¾ lbs./sq. in.

(b) A similar coating is prepared in which the ammonium salt used has, at 22% solids, a viscosity of 16 poises and the coating mix has a viscosity of 11 poises.

(c) A similar coating is prepared in which the ammonium salt is a copolymer of methyl methacrylate and methacrylic acid at a weight ratio of 72.5:27.5. The solution viscosity at 22% solids is 6 poises and the coating mix has a viscosity of 10 poises.

(d) A coating similar to that obtained in part (c) is prepared in which the ammonium salt of the MMA:MAA copolymer has a viscosity at 22% solids of 3.5 poises and the coating mix has a viscosity of 1.3 poises.

Example 4

A coating is prepared from an aqueous dispersion containing 100 parts of a copolymer of ethyl acrylate:methyl methacrylate:methacrylic acid, 66:32.7:1.3, and 40 parts of the ammonium salt of an MMA:MAA 72.5:27.5 copolymer. The viscosity of the latter polymer at 22% solids is 2.5 poises and the coating mix has a viscosity of 0.8 poise. The coating has a heat-seal temperature of 210° F. and shows no blocking face-to-face or face-to-back at 140° F. and 75% relative humidity under a pressure of 2¾ lbs./sq. in.

Example 5

A coating is prepared as in Example 4, substituting 100 parts of a styrene:butadiene, 6:4 copolymer for the EA:MMA:MAA copolymer. Similar coating properties are obtained.

Example 6

A coating is prepared as in Example 4, substituting 100 parts of a vinyl acetate:EA:MA, 75:10:15 copolymer for the EA:MMA:MAA copolymer. Similar coating properties are obtained.

It is to be understood that changes and variations may be made without departing from the spirit and scope of the invention as defined in the appended claims.

We claim:

1. A coating composition comprising an aqueous dispersion containing dispersed therein a film-forming material consisting exclusively of a mixture of (1) an ammonium salt of a low average molecular weight copolymer of 20 to 30% of an acid selected from the group consisting of acrylic acid and methacrylic acid with 70 to 80% of methyl methacrylate, said salt having a viscosity at normal room temperature at a 22% concentration in water between 2 and 30 poises, and (2) a water-insoluble linear addition polymer having a $T_i$ value not over 30° C., determined at 300 kg./cm.$^2$, the proportions between (1) and (2) being from 10 to 35 parts by weight of the former to 90 to 65 parts of the latter.

2. As an article of manufacture, a fibrous substrate selected from the group consisting of papers and paperboards having on at least one surface thereof a clear, glossy block-resistant deposit comprising synthetic polymeric material consisting of a mixture of (1) an ammonium salt of a low average molecular weight copolymer of 20 to 30% of an acid selected from the group consisting of acrylic acid and methacrylic acid with 70 to 80% of methyl methacrylate, said salt having a viscosity at normal room temperature at a 22% concentration in water between 2 and 30 poises, and (2) a water-insoluble linear addition polymer having a $T_i$ value not over 30° C. determined at 300 kg./cm.$^2$, the proportions between (1) and (2) being from 10 to 35 parts by weight of the former to 90 to 65 parts of the latter.

3. An aqueous composition comprising a dispersion in water of synthetic polymeric material consisting of (1) an ammonium salt of a low average molecular weight copolymer of 20 to 30% of an acid selected from the group consisting of acrylic acid and methacrylic acid with 70 to 80% of methyl methacrylate, said salt having a viscosity at normal room temperature at a 22% concentration in water between 2 and 30 poises, and (2) a water-insoluble linear addition polymer having a $T_i$ value not over 30° C. determined at 300 kg./cm.$^2$, the proportions between (1) and (2) being from 10 to 35 parts by weight of the former to 90 to 65 parts of the latter, the salt being dissolved in the water, and the dispersion having a total solids content of about 5 to 70% by weight.

4. An aqueous composition comprising a dispersion in water of synthetic polymeric material consisting of (1) an ammonium salt of a low average molecular weight copolymer of 20 to 30% of an acid selected from the group consisting of acrylic acid and methacrylic acid with 70 to 80% of methyl methacrylate, said salt having a viscosity at normal room temperature at a 22% concentration in water between 2 and 30 poises, and (2) a water-insoluble linear copolymer of butadiene with a member selected from the group consisting of acrylonitrile and styrene having a $T_i$ value of −45° C. to 30° C. determined at 300 kg./cm.$^2$, the proportions between (1) and (2) being from 10 to 35 parts by weight of the former to 90 to 65 parts of the latter, the salt being dissolved in the water, and the dispersion having a total solids content of about 5 to 70% by weight.

5. An aqueous composition comprising a dispersion in water of synthetic polymeric material consisting of (1) an ammonium salt of a low average molecular weight copolymer of 20 to 30% of an acid selected from the group consisting of acrylic acid and methacrylic acid with 70 to 80% of methyl methacrylate, said salt having a viscosity at normal room temperature at a 22% concentration in water between 2 and 30 poises, and (2) a water-insoluble linear polymer of at least one ester of a member selected from the group consisting of acrylic acid and methacrylic acid having a $T_i$ value of −45° C. to 30° C. determined at 300 kg./cm.$^2$, the proportions between (1) and (2) being from 10 to 35 parts by weight of the former to 90 to 65 parts of the latter, the salt being dissolved in the water, and the dispersion having a total solids content of about 5 to 70% by weight.

6. An aqueous composition comprising a dispersion in water of synthetic polymeric material consisting of (1) an ammonium salt of a low average molecular weight copolymer of 20 to 30% of an acid selected from the group consisting of acrylic acid and methacrylic acid with 70 to 80% of methyl methacrylate, said salt having a viscosity at normal room temperature at a 22% concentration in water between 2 and 30 poises, and (2) a water-insoluble linear copolymer of at least one ester of acrylic acid and of at least one hardening comonomer selected from the group consisting of an alkyl methacrylate in which the alkyl group is the residue of an alcohol selected from the group consisting of primary and secondary alkanols having 1 to 4 carbon atoms, vinyl acetate, styrene, acrylonitrile, methacrylonitrile, vinyl chloride, and vinylidene chloride, said copolymer having a $T_i$ of $-45°$ C. to $30°$ C. determined at 300 kg./cm.$^2$, the proportions between (1) and (2) being from 10 to 35 parts by weight of the former to 90 to 65 parts of the latter, the salt being dissolved in the water, and the dispersion having a total solids content of about 5 to 70% by weight.

7. An aqueous composition comprising a dispersion in water of synthetic polymeric material consisting of (1) an ammonium salt of a low average molecular weight copolymer of 20 to 30% of an acid selected from the group consisting of acrylic acid and methacrylic acid with 70 to 80% of methyl methacrylate, said salt having a viscosity at normal room temperature at a 22% concentration in water between 2 and 30 poises, and (2) a water-insoluble linear copolymer of vinyl acetate and methyl acrylate having the proportions between (1) and (2) from 10 to 35 parts by weight of the former to 90 to 65 parts of the latter, the salt being dissolved in the water, and the dispersion having a total solids content of about 5 to 70% by weight.

8. An aqueous composition comprising a dispersion in water of synthetic polymeric material consisting of (1) an ammonium salt of a low average molecular weight copolymer of 20 to 30% of an acid selected from the group consisting of acrylic acid and methacrylic acid with 70 to 80% of methyl methacrylate, said salt having a viscosity at normal room temperature at a 22% concentration in water between 2 and 30 poises, and (2) a water-insoluble linear copolymer of vinyl acetate and ethyl acrylate having the proportions between (1) and (2) from 10 to 35 parts by weight of the former to 90 to 65 parts of the latter, the salt being dissolved in the water, and the dispersion having a total solids content of about 5 to 70% by weight.

9. An aqueous composition comprising a dispersion in water of synthetic polymeric material consisting of (1) an ammonium salt of a low average molecular weight copolymer of 20 to 30% of an acid selected from the group consisting of acrylic acid and methacrylic acid with 70 to 80% of methyl methacrylate, said salt having a viscosity at normal room temperature at a 22% concentration in water between 2 and 30 poises, and (2) a water-insoluble linear copolymer of vinyl acetate, ethyl acrylate, and methyl acrylate having the proportions between (1) and (2) from 10 to 35 parts by weight of the former to 90 to 65 parts of the latter, the salt being dissolved in the water, and the dispersion having a total solids content of about 5 to 70% by weight.

10. An aqueous composition comprising a dispersion in water of synthetic polymeric material consisting of (1) an ammonium salt of a low average molecular weight copolymer of 20 to 30% of an acid selected from the group consisting of acrylic acid and methacrylic acid with 70 to 80% of methyl methacrylate, said salt having a viscosity at normal room temperature at a 22% concentration in water between 2 and 30 poises, and (2) a water-insoluble linear copolymer of butadiene and styrene having a $T_i$ of $-45°$ C. to $30°$ C. determined at 300 kg./cm.$^2$, the proportions between (1) and (2) being from 10 to 35 parts by weight of the former to 90 to 65 parts of the latter, the salt being dissolved in the water, and the dispersion having a total solids content of about 5 to 70% by weight.

11. An aqueous composition comprising a dispersion in water of synthetic polymeric material consisting of (1) an ammonium salt of a low average molecular weight copolymer of 20 to 30% of an acid selected from the group consisting of acrylic acid and methacrylic acid with 70 to 80% of methyl methacrylate, said salt having a viscosity at normal room temperature at a 22% concentration in water between 2 and 30 poises, and (2) a water-insoluble linear copolymer of ethyl acrylate and methyl methacrylate having a $T_i$ of $-45°$ C. to $30°$ C. determined at 300 kg./cm.$^2$, the proportions between (1) and (2) being from 10 to 35 parts by weight of the former to 90 to 65 parts of the latter, the salt being dissolved in the water, and the dispersion having a total solids content of about 5 to 70% by weight.

12. A composition as defined in claim 11 in which the ammonium salt is a complex zinc ammonium salt.

13. A composition as defined in claim 11 in which the salt is a simple ammonium salt.

14. An aqueous composition comprising a dispersion in water of synthetic polymeric material consisting of (1) an ammonium salt of a low average molecular weight copolymer of 20 to 30% of an acid selected from the group consisting of acrylic acid and methacrylic acid with 70 to 80% of methyl methacrylate, said salt having a viscosity at normal room temperature at a 22% concentration in water between 2 and 30 poises, and (2) a water-insoluble linear addition polymer having a $T_i$ value not over $30°$ C. determined at 300 kg./cm.$^2$ and being free of hydrophilic groups, the proportions between (1) and (2) being from 10 to 35 parts by weight of the former to 90 to 65 parts of the latter, the salt being dissolved in the water, and the dispersion having a total solids content of about 5 to 70% by weight.

15. An aqueous composition comprising a dispersion in water of synthetic polymeric material consisting of (1) an ammonium salt of a low average molecular weight copolymer of 20 to 30% of an acid selected from the group consisting of acrylic acid and methacrylic acid with 70 to 80% of methyl methacrylate, said salt having a viscosity at normal room temperature at a 22% concentration in water between 2 and 30 poises, and (2) a water-insoluble linear addition polymer having a $T_i$ value not over $30°$ C. determined at 300 kg./cm.$^2$, the proportions between (1) and (2) being from 10 to 35 parts by weight of the former to 90 to 65 parts of the latter, said dispersion containing finely divided zinc oxide suspended therein in an amount of 5 to 20% by weight of the total polymer solids of (1) and (2), the salt being dissolved in the water, and the dispersion having a total solids content of about 5 to 70% by weight.

16. An aqueous composition comprising a dispersion in water of synthetic polymeric material consisting of (1) a complex zinc ammonium salt of a low average molecular weight copolymer of 20 to 30% of an acid selected from the group consisting of acrylic acid and methacrylic acid with 70 to 80% of methyl methacrylate, said salt having a viscosity at normal room temperature at a 22% concentration in water between 2 and 30 poises, and (2) a water-insoluble linear addition polymer having a $T_i$ value not over $30°$ C. determined at 300 kg./cm.$^2$, the proportions between (1) and (2) being from 10 to 35 parts by weight of the former to 90 to 65 parts of the latter, the salt being dissolved in the water, and the dispersion having a total solids content of about 5 to 70% by weight.

17. An aqueous composition comprising a dispersion in water of synthetic polymeric material consisting of (1) a simple ammonium salt of a low average molecular weight copolymer of 20 to 30% of an acid selected from the group consisting of acrylic acid and methacrylic acid with 70 to 80% of methyl methacrylate, said salt having a viscosity at normal room temperature at a 22% concentration in water between 2 and 30 poises, and (2) a water-insoluble linear addition polymer having a $T_i$ value not over 30° C. determined at 300 kg./cm.$^2$, the proportions between (1) and (2) being from 10 to 35 parts by weight of the former to 90 to 65 parts of the latter, the salt being dissolved in the water, and the dispersion having a total solids content of about 5 to 70% by weight.

References Cited in the file of this patent

UNITED STATES PATENTS

| | | |
|---|---|---|
| 2,317,725 | Billig | Apr. 27, 1943 |
| 2,724,707 | Brown | Nov. 22, 1955 |
| 2,832,746 | Jackson | Apr. 29, 1958 |
| 2,904,526 | Uelzmann | Sept. 15, 1959 |

FOREIGN PATENTS

| | | |
|---|---|---|
| 753,322 | Great Britain | July 25, 1956 |
| 885,178 | France | May 17, 1943 |
| 150,970 | Australia | Apr. 21, 1953 |

OTHER REFERENCES

Payne: "Paint, Oil and Chemical Review," October 22, 1953, Paper 14, 16.